(12) United States Patent  (10) Patent No.: US 8,678,167 B1
Nakamura et al.  (45) Date of Patent: Mar. 25, 2014

(54) WORK TRANSFER DEVICE

(75) Inventors: Yasuo Nakamura, Aichi-prefecture (JP); Norio Kito, Aichi-prefecture (JP)

(73) Assignees: Shinmei Industry Co., Ltd., Aichi-prefecture (JP); Kyoei Kogyo Co., Ltd., Aichi-prefecture (JP)

( * ) Notice: Subject to any disclaimer, the term of this patent is extended or adjusted under 35 U.S.C. 154(b) by 0 days.

(21) Appl. No.: 13/605,090

(22) Filed: Sep. 6, 2012

(51) Int. Cl.
*B65G 17/00* (2006.01)

(52) U.S. Cl.
USPC ..................... 198/343.2; 198/465.3

(58) Field of Classification Search
USPC .............. 198/343.1, 343.2, 465.1, 465.3, 832
See application file for complete search history.

(56) References Cited

U.S. PATENT DOCUMENTS

| | | | | |
|---|---|---|---|---|
| 4,088,220 A | * | 5/1978 | Jacksch et al. | 198/343.2 |
| 4,653,972 A | * | 3/1987 | Lewis | 198/343.2 |
| 5,226,524 A | * | 7/1993 | Guttinger et al. | 198/343.2 |
| 6,357,580 B1 | * | 3/2002 | Ismai | 198/343.2 |
| 6,494,142 B2 | * | 12/2002 | Masugaki et al. | 198/465.3 |
| 7,584,837 B2 | * | 9/2009 | Roether et al. | 198/343.1 |

FOREIGN PATENT DOCUMENTS

| | | |
|---|---|---|
| JP | 4-170175 | 6/1992 |
| JP | 2005-066806 | 3/2005 |

* cited by examiner

*Primary Examiner* — James R Bidwell
(74) *Attorney, Agent, or Firm* — Wenderoth, Lind & Ponack, L.L.P.

(57) ABSTRACT

A work transfer device is capable of moving a carriage in any direction and easily changes processes even with a simple configuration. The work transfer device includes a frame having a slit in a transfer direction, a ribbon body stored in the frame such that an upper portion is guided by the slit, a carriage coupling part connected to an upper end of the ribbon body and protruding from an upper side of the frame, a driving part feeding power to move the ribbon body in the transfer direction, and a tool carriage, which has a support part supporting a work W and has a coupling part coupled to the carriage coupling part, travelling on the frame.

5 Claims, 8 Drawing Sheets

WORK TRANSFER DEVICE

BACKGROUND OF THE INVENTION

1. Field of the Invention

The present invention relates to a work transfer device used to mount an engine (engine unit) in a vehicle body in a vehicle production line, for example.

2. Description of Related Art

A conventional engine mounting device is configured by a main line assembling a vehicle and an engine mounting device (decking device), and the decking device includes a chassis preparing line assembling the engine and chassis (suspension system), and a mounting station mounting an engine assembly, which is assembled in the chassis preparing line and is mounted in a mounting carriage in a transfer station, in the vehicle in the main line.

The initial chassis preparing line is configured so as to place the engine and the chassis on an automatic guided vehicle (AGV), assemble the engine and the chassis together on the automatic guided vehicle, and assemble the assembled engine assembly to the vehicle with use of the decking device.

At this time, since a few dozens of automatic guided vehicles are required for the chassis preparing line, and the cost (value) of the automatic guided vehicle is high, a device constituting the chassis preparing line is disadvantageously expensive. Further, a large space for the waiting and travelling of the automatic guided vehicles is needed.

Figure 9A:
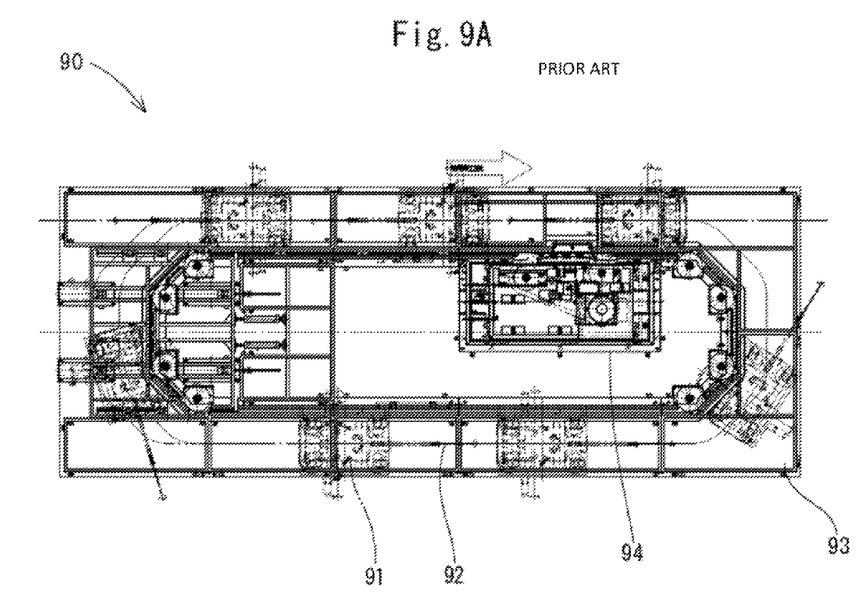
FIG. 9A is an overall view.
Figure 9B:
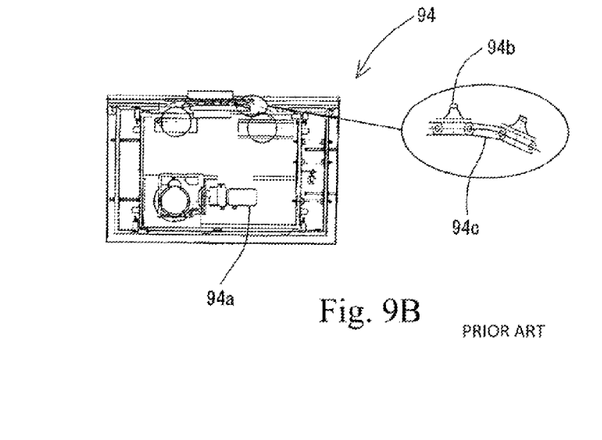
FIG. 9B is an enlarged view of a main part.

As shown in FIGS. 9A and 9B, a chassis preparing line 90 described in Japanese Patent No. 4170175 (Japanese Patent Publication No. 2005-66806) is configured so as to move a tool carriage 91 that mounts the engine and the chassis with an annularly-arranged driving chain 92, assemble the engine and the chassis together, and assemble the assembled engine assembly to the vehicle with use of the engine mounting device.

However, as shown in FIG. 9A, in the chassis preparing line 90 having such configuration, the tool carriage 91 travels on a frame 93, and the frame 93 is configured by integrating a body frame and a travelling frame. Accordingly, since the structure of the frame 93 is large, to change the chassis preparing line 90 with a change of processes, for example, increase the number of tool carriages 91, a major restructuring work of the frame 93 is required.

In addition, as shown in FIG. 9B, a driving part 94 feeding power to the driving chain 92 transmits a driving force from a driving motor 94a with use of a chain 94c having a particular structure, to which a slat plate 94b is attached, leading to an increase in costs of the entire device.

The present invention is made in consideration of the above-mentioned circumstances, and its object is to provide a work transfer device capable of moving a carriage in any direction and easily changing processes even with a simple configuration.

SUMMARY OF THE INVENTION

To attain the object, the present invention provides a work transfer device including a frame having a slit in a transfer direction, a ribbon body stored in the frame such that an upper portion is guided by the slit of the frame, a carriage coupling part that is connected to an upper end of the ribbon body and protrudes from an upper side of the frame, a driving part feeding power to move the ribbon body along the slit in the transfer direction, and a tool carriage, which has a support part supporting a work and has a coupling part coupled to the carriage coupling part, travelling on the frame. (claim 1)

The frame forms a travelling surface (table) for the tool carriage at a position that is higher than an installation floor surface for the work transfer device by a width of the ribbon body or larger such that the ribbon body arranged in the slit does not protrude from the upper surface (travelling surface of the tool carriage) of the frame, and has enough strength to mount the tool carriage mounting the work thereon.

The ribbon body is shaped like a plate that is thinner than a width of the slit, and is made of an elastic material. For example, it is preferred that the ribbon body is made of a spring steel material having an enough tensile strength to transmit power to move the all tool carriages and works in the work transfer device, and an enough elasticity to be easily bent along the line formed by the slit. Preferably, the ribbon body is made of a steel material, and the steel ribbon body (ribbon steel) has a thickness of about 1 mm. Further, preferably, the ribbon body is coupled in the form of a loop. In this case, in the work transfer device, the tool carriage travels on a track where the loop-like ribbon body is arranged.

It is preferred that the carriage coupling part is made of a material having a low frictional resistance, such as a synthetic resin having an outer appearance that is much wider than the slit and a coupling recess.

It is preferred that the driving part comes into contact with an upstream portion of the ribbon body and pulls the ribbon body from an upstream end, and sandwiches the ribbon body from its both surfaces to apply a tensile force due to frictional contact. Alternatively, a knurl or a through hole may be formed in a side surface of the ribbon body to form irregularities, and the driving part may be provided with irregularities engaging with the irregularities of the ribbon body to reliably transmit power. Further, it is preferred that the tool carriage can be freely moved on the frame, and includes a wheel rolling in a front-back direction along the transfer direction and a wheel freely changing its direction.

In the work transfer device having such configuration, by applying the tensile force to the ribbon body by the driving part, the ribbon body is used as a slider, and sliding of the ribbon body feeds power to travel the tool carriage via the carriage coupling part coupled to the upper side of the tool carriage. In the curved portion of the slit, since the ribbon body bends in the slit-forming direction to transmit the tensile force, the tool carriage can be transferred in any direction.

In the case where the ribbon body is configured by ribbon body parts that can be coupled to each other at a predetermined length, each ribbon body part includes front and rear ribbon body coupling parts separably coupled to the front and rear ribbon body parts at front and rear ends in the transfer direction, and the frame is configured by frame parts that can be separated at each slit having the same length of each ribbon body part (claim 2), since the ribbon body parts can be coupled to each other at the slit provided in the frame part, the slit having the same length as the ribbon body part, by adjusting the combination of the coupled ribbon body parts with recombination of the frame parts, the loop-like track can be freely recombined, and the travelling route of the tool carriage in the work transfer device can be easily changed. It is preferred that the length of the ribbon body part and the length of the slit of the frame is the length of one process of the working process in a factory.

In the case where the slit is annularly formed, and a roller conveyor guiding the lower end of the ribbon body in the curved portion of the slit is provided (claim 3), since the lower end of the ribbon body is held to be movable in the slit-forming direction by the roller conveyor even in the curved portion of the slit, the tensile force of the driving part acts on each part of the annularly-coupled ribbon body, thereby causing the tool carriage to travel along the slit. It is preferred that the width of the slit in the curved portion is much larger than the thickness of the ribbon body.

In the case where the driving part includes a first roller coming in contact with one side surface of the ribbon body, a second roller opposed to the first roller, the second roller coming in contact with the other side surface of the ribbon body and being pressed onto the ribbon body, a driving motor feeding a rotational force to the first roller, and a power transmission mechanism transmitting power to rotate the second roller in a reverse direction to a rotational direction of the first roller due to the rotational force of the driving motor (claim 4), the driving force can be applied to the ribbon body by means of the first roller and the second roller. At this time, the second roller rotates in the reverse direction to the rotational direction of the first roller, and is pressed onto the ribbon body with a spring as a component of a tensioner, a frictional force between the surfaces of the first roller and the second roller and a contact portion of the ribbon body can be increased, thereby reliably applying the driving force to the ribbon body.

In the case where the driving part includes a first roller coming in contact with one side surface of the ribbon body, a second roller opposed to the first roller, the second roller coming in contact with the other side surface of the ribbon body and being pressed onto the ribbon body, and a driving motor feeding a rotational force to the first roller, the second roller is driven by the first roller and rotates in a reverse direction to a rotational direction of the first roller (claim 5), the driving force can be applied to the ribbon body by means of the first roller. At this time, the second roller is driven by the first roller, rotates in the reverse direction to the rotational direction of the first roller, and is pressed onto the ribbon body with a spring as a component of a tensioner. That is, by using the component of the tensioner for only the second roller, a constant tension is applied to the second roller and therefore, even when the diameter of the roller is decreased due to friction with the ribbon body, the first roller and the second roller coming in contact with the other side surface of the ribbon body are in close contact with each other. Further, since the ribbon body is transferred by applying the driving force to the ribbon body via only the first roller without transmitting the driving force to the second roller, that is, the ribbon body is transferred in the state where the second roller follows the first roller (free rotating state), as compared to the case where the driving force is transmitted to the second roller for fast-forwarding of the ribbon body, the assembling step of the fast-forwarding unit can be omitted, leading to a decrease in costs.

As described above, the device according to the present invention has a simpler configuration than conventional transfer devices using the automatic guided vehicle and transfer devices using a chain to feed the driving force and therefore, manufacturing costs can be reduced. Further, each member is more light-weighted than that in the devices using the chain or the automatic guided vehicle, the work transfer device can be easily assembled, and the process can be easily changed. Moreover, since the elastic ribbon body can change its direction with a smaller rotational radius (R size) than that of the transfer devices using the automatic guided vehicle, the work transfer device can be arranged in a smaller space.

Since the thin plate-like ribbon body is driven in the state where the ribbon body is sandwiched between the rollers of the driving part and pressed with the rollers, the driving force can be reliably transmitted to the thin plate-like ribbon steel.

Moreover, by manufacturing the travelling frames of the same pitch, the driving unit can be assembled to any travelling frame, thereby simplifying process change.

BRIEF DESCRIPTION OF THE DRAWINGS

FIGS. 3A and 3B are views for describing a configuration of a ribbon body of the work transfer device.

FIGS. 9A and 9B are views showing a configuration of a conventional work transfer device.

DETAILED DESCRIPTION OF THE PREFERRED EMBODIMENTS

A configuration of a work transfer device 1 according to the present invention will be described with reference to FIG. 1 to FIG. 5.

FIG. 1 to FIG. 5 show the first embodiment of the present invention, in which when a thin ribbon body (ribbon steel) is carried (transferred) by a driving motor of a driving part (driving unit), a driving force of the driving motor is transmitted to a roller on the opposite side (below-mentioned second roller), and the ribbon body (ribbon steel) is sandwiched between a first roller and the second roller, to which a rotational force is fed from the driving motor, from both side surfaces of the ribbon body (ribbon steel) to carry (transfer) the ribbon body (ribbon steel), and a spring (an example of components of a tensioner) is attached to the second roller of the first roller and the second roller such that the rollers sandwich the ribbon body (ribbon steel) therebetween under a certain tension to reliably drive the thin ribbon body (ribbon steel). That is, the work transfer device 1 of the present invention has a frame 3 having a slit 2 in a transfer direction, a ribbon body 4 stored in the frame 3 such that an upper portion is guided by the slit 2 of the frame 3, carriage coupling parts 5 that are connected to an upper end of the ribbon body 4 and protrudes from an upper side of the frame 3, a driving part 6 feeding power to move the ribbon body 4 along the slit 2 in the transfer direction, and a tool carriage 7, which has a support part 7a supporting an engine or an engine assembly as an example of a work W and has a coupling part 8 coupled to the carriage coupling part 5, travelling on the frame 3.

The work transfer device 1 in this embodiment transfers the engine or the engine assembly of the vehicle or the like as the work W and thus, is used as a device of transferring the engine or a device of mounting the engine to the vehicle.

Figure 1:
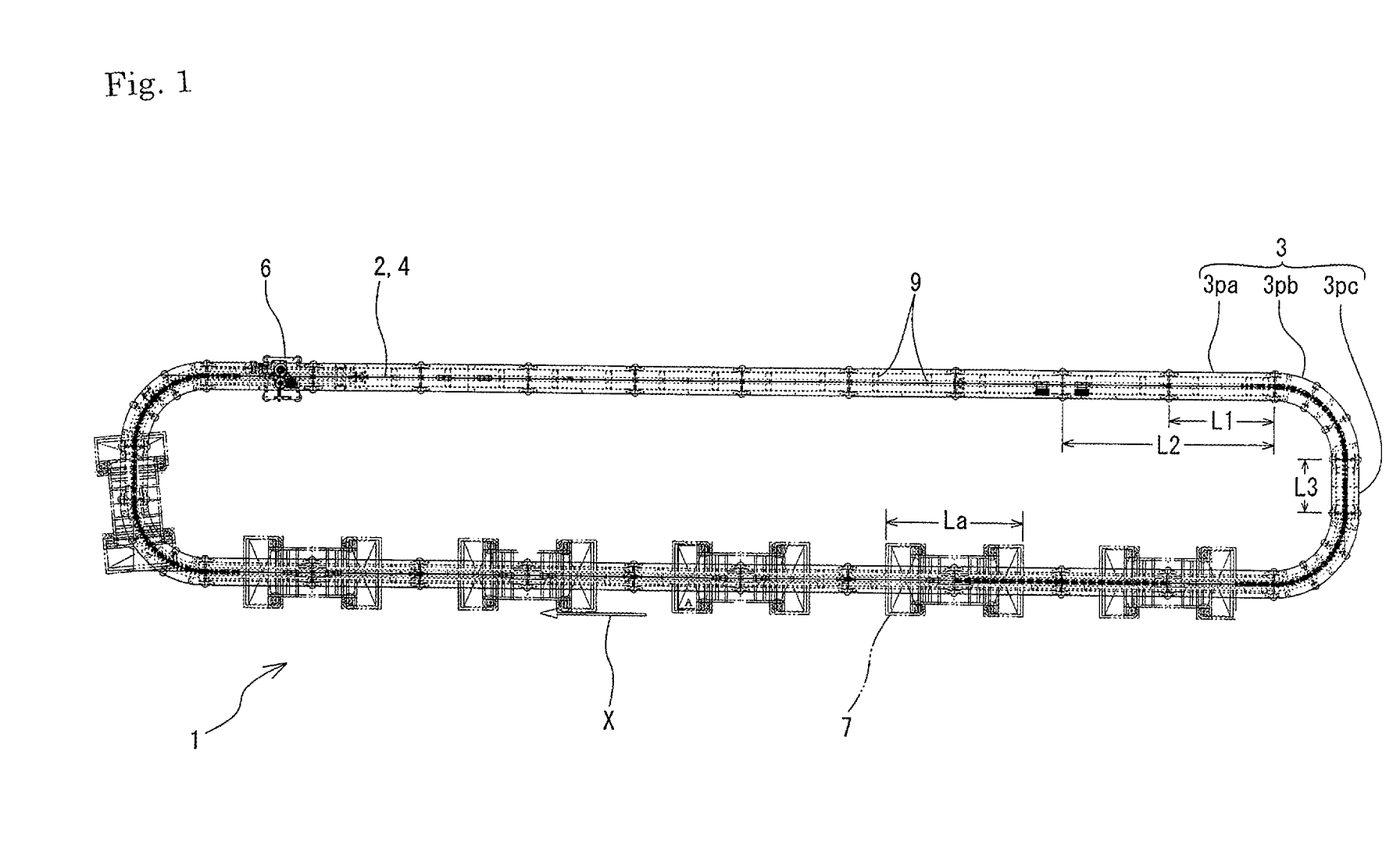
FIG. 1 is a plan view showing an overall configuration of a work transfer device in accordance with a first embodiment of the present invention.

As shown in FIG. 1, the slit 2 is annular, and the frame 3 is formed by coupling a plurality of separable frame parts 3pa, 3pb having the slit 2 of a length L1 that is a half of a span L2 as one process of a working process, and a separable frame part 3*pc* having the slit 2 of a length L3 that is one fourth of the span L2. The frame parts 3*pa*, 3*pc* each have the linear slit 2, and the frame part 3*pb* has the slit 2 curved at 90 degrees.

Figure 2:
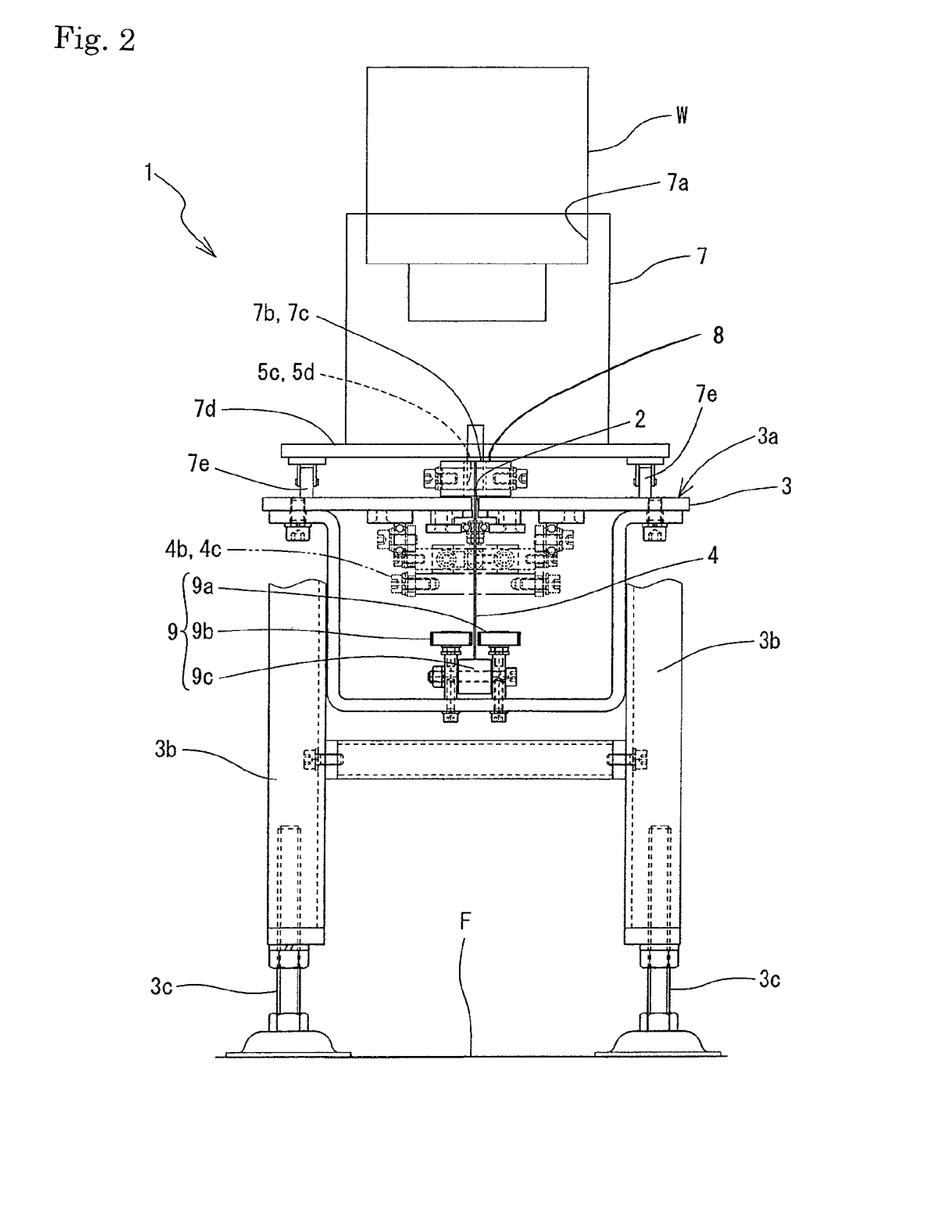
FIG. 2 is a side view showing the work transfer device when viewed from the transfer direction.
Figure 3:
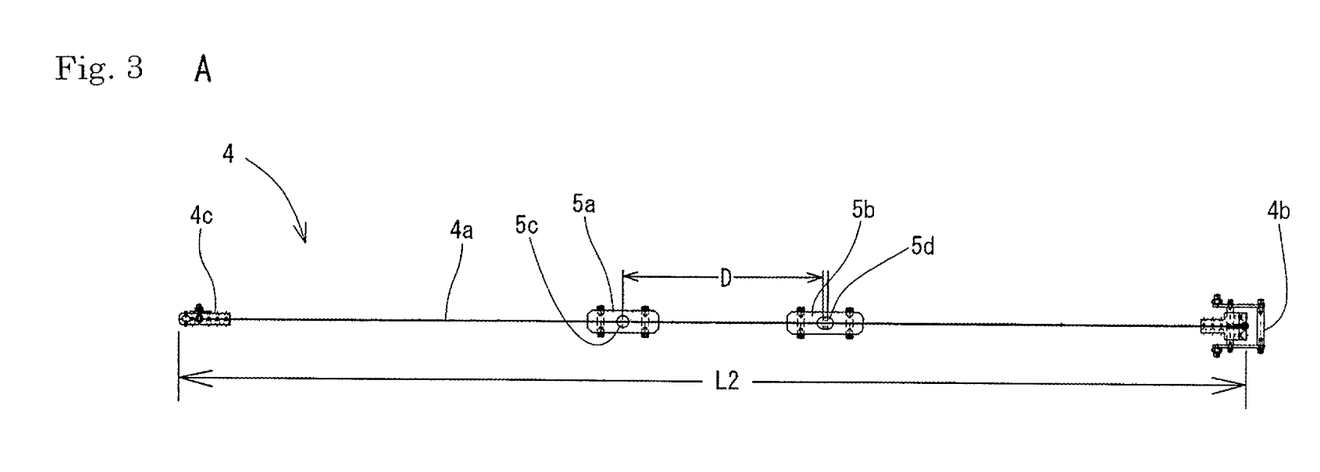
FIG. 3A is a plan view.
FIG. 3B is a side view.

As shown in FIG. 2, a travelling surface 3*a* for the tool carriage 7 is formed on the upper surface of the frame 3, and legs 3*b* provided at least four corners of the frame parts 3*pa*, 3*pb*, 3*pc* each are provided with an adjustor 3*c* for absorbing irregularities of a floor surface F to keep the travelling surface 3*a* flat. There is provided a roller conveyor 9 having a pair of rollers 9*a*, 9*b* that come into contact with both side surfaces of a lower end of the ribbon body 4 at predetermined intervals and a roller 9*c* that comes into contact with the lower end of the ribbon body 4 at predetermined intervals. The roller conveyor 9 guiding the lower end of the ribbon body 4 is continuously provided in the frame part 3*pb* forming the curved slit 2 and portions in front of and in the rear of the frame part 3*pb*.

As shown in FIG. 3A, the ribbon body 4 is a plate-like steel member (ribbon steel) that is thinner than the width of the slit 2, and is formed of a separable ribbon body part 4*a* (ribbon steel part) corresponding to the span L2 as one process. The ribbon body part 4*a* includes ribbon body coupling parts 4*b*, 4*c* at its both front and rear ends in a transfer direction X, respectively. In this embodiment, the ribbon body part 4*a* has a thickness of, for example, 1 mm (refer to FIG. 3A), a width in a vertical direction of a little over 100 mm (refer to FIG. 3B), and a width in a longitudinal direction of a little over 2400 mm.

In addition, a plurality of protrusions 4*d* are formed on an upper end of a central portion of the ribbon body part 4*a*, and the carriage coupling parts 5 can be fixed to the protrusions 4*d* with screws. Even when the ribbon body 4 is stored in the slit 2, the protrusions 4*d* and the carriage coupling parts 5 from the upper side of the travelling surface 3*a*.

As shown in FIG. 3B, the two front and rear carriage coupling parts 5 are spaced from each other in the transfer direction X of the ribbon body 4, and these carriage coupling parts 5*a*, 5*b* includes coupling recesses 5*c*, 5*d*, respectively. In addition, one recess 5*d* is shaped like a long hole to have a play of 10 mm, for example, in the front-back direction. A distance D between the front and rear recesses 5*c*, 5*d* is appropriately set according to a length of La of the tool carriage 7 in the transfer direction, and in this embodiment, the distance D is set to be about 30% of the length La of the tool carriage 7.

The tool carriage 7 includes a frame 7*d* having coupling parts 7*b*, 7*c* formed of rods coupled by being fitted into the recesses 5*c*, 5*d* provided in the carriage coupling parts 5*a*, 5*b*, respectively, and a caster 7*e* that allows the tool carriage 7 to move in any direction at a lower end of the frame 7*d*. It is preferred that the caster 7*e* is a free caster or a ball caster that can change its rotational direction when the transfer direction is rapidly curved, but when the transfer direction is almost linear, the caster 7*e* may be a wheel caster.

Figure 4:
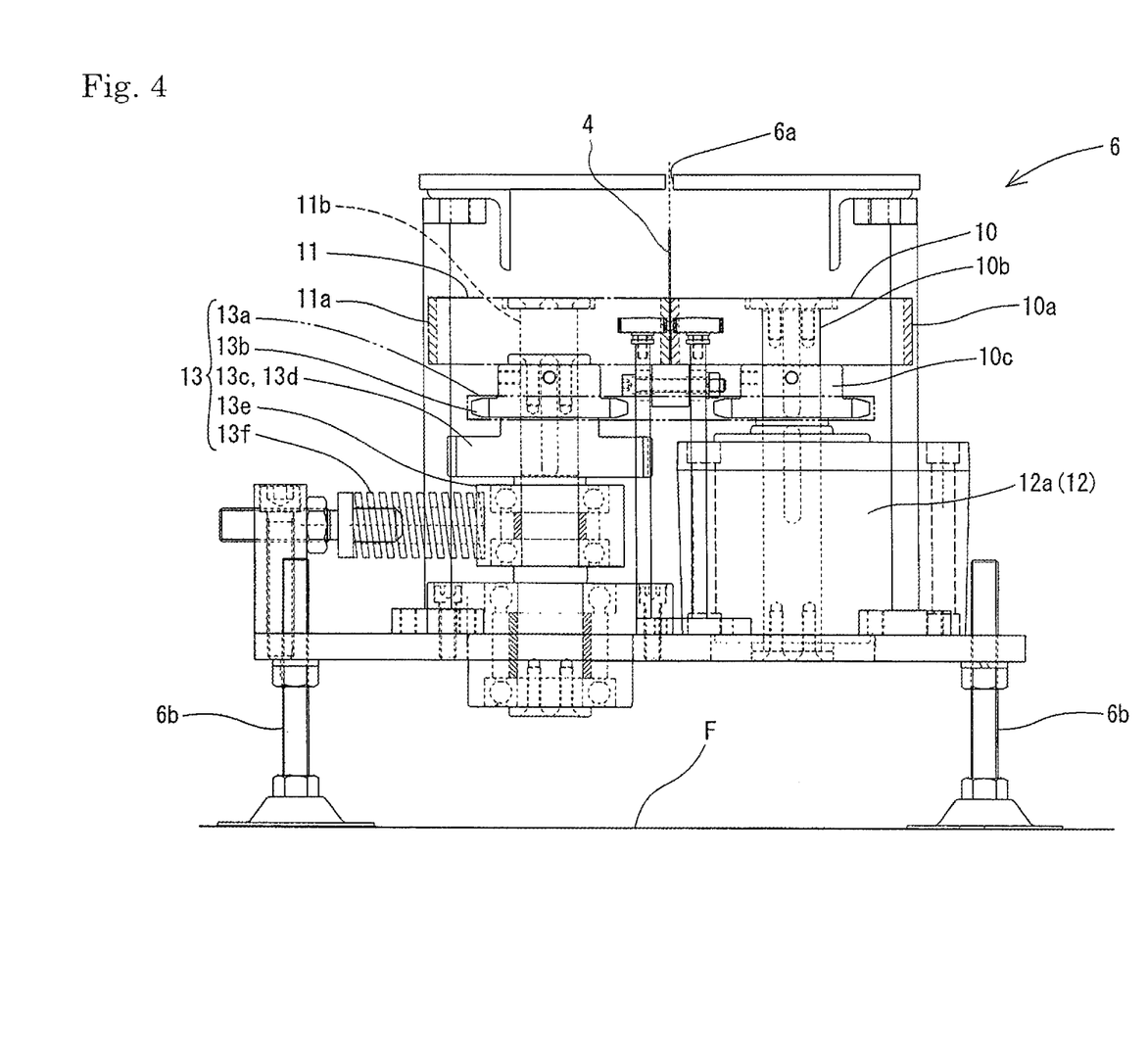
FIG. 4 is a side view showing a configuration of a driving part of the work transfer device.
Figure 5:
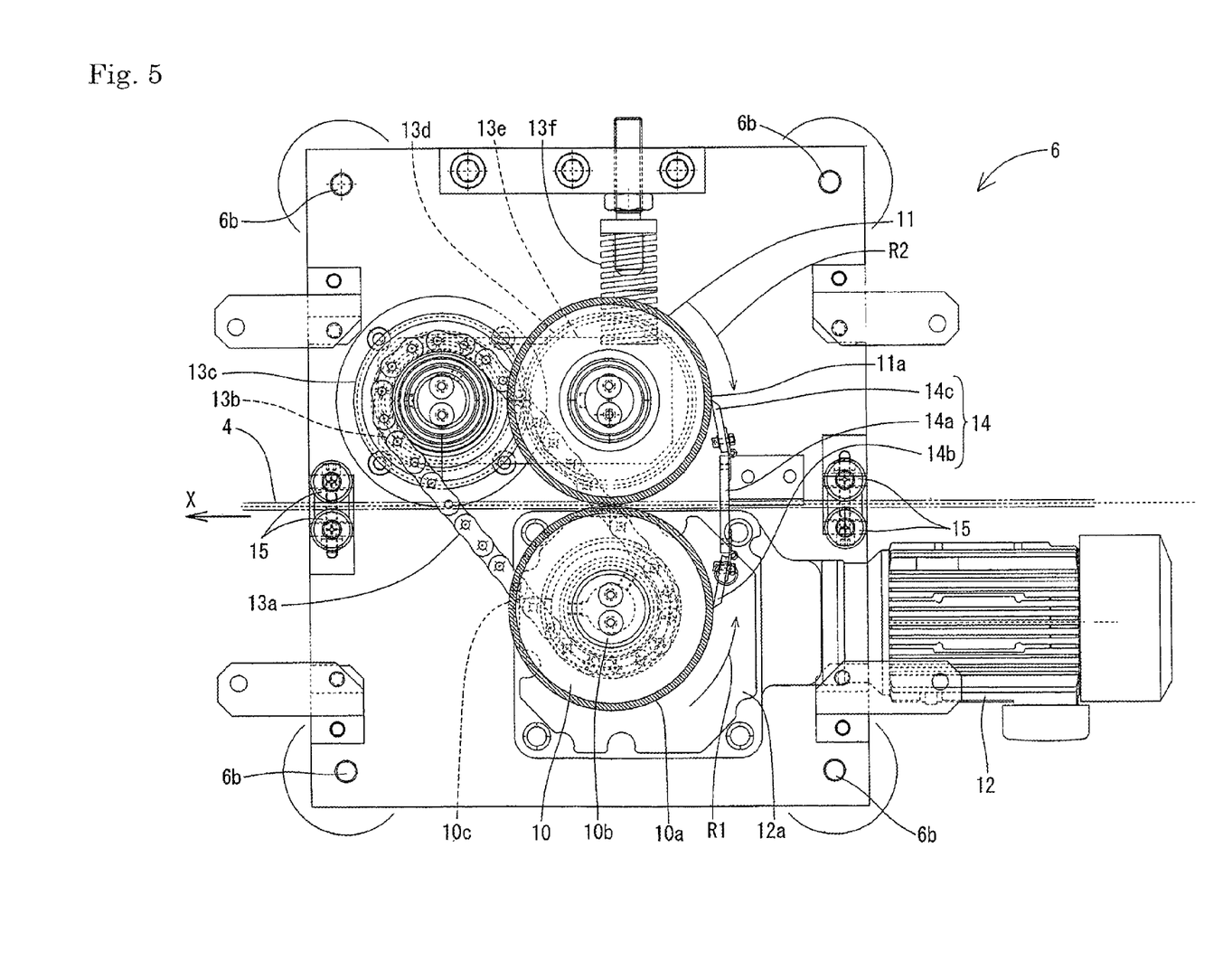
FIG. 5 is a plan view showing the driving part.

Since the driving part 6 in the work transfer device 1 shown in FIGS. 4, 5 applies the tensile force to the annularly-arranged ribbon body 4 to drive the ribbon body 4 in the transfer direction, the driving part 6 may be located at any position with respect to the ribbon body 4. However, since the driving part 6 drives the tool carriage 7 with the tensile force applied to the ribbon body 4, it is preferred that the driving part 6 is arranged upstream of the tool carriage 7 mounting the work W thereon, and the ribbon body 4 is arranged in a slit 6*a* provided in the upper end of the driving part 6.

A reference numeral 6*b* denotes a leg with adjustor, which is provided such that the driving part 6 is arranged on the floor surface F while keeping flat. When the ribbon body 4 is not annularly arranged, it is needed to arrange the driving part 6 upstream of the tool carriage 7 mounting the work W thereon.

The driving part 6 includes a first roller 10 coming in contact with one side surface of the ribbon body 4, a second roller 11 that comes in contact with the other side surface opposed to the first roller 10 and is pressed onto the ribbon body 4, a driving motor 12 feeding a rotational force to the first roller 10, a power transmission mechanism 13 transmitting power to rotate the second roller 11 in a reverse direction to a rotational direction of the first roller 10 with the rotational force of the driving motor 12, and a blade 14 coming in contact with the surfaces 10*a*, 11*a* of the first roller 10 and the second roller 11 to scrape matters adhered to the roller surfaces 10*a*, 11*a* off.

The surfaces 10*a*, 11*a* formed on outer circumferences of the first roller 10 and the second roller 11 are made of a material having a high frictional resistance, and the first roller 10 is coupled to an axis 10*b* rotated by a gear box 12*a* provided in an output of the driving motor 12, thereby being directly driven by the driving motor 12. A sprocket 10*c* is also coupled to the axis 10*b*.

The power transmission mechanism 13 includes a chain 13*a* wound around the sprocket 10*c*, a sprocket 13*b* that is arranged on the opposite side across the ribbon body 4 and around which the chain 13*a* is wound, a first auxiliary roller 13*c* that is arranged and rotates together with the sprocket 13*b* on the same axis, a second auxiliary roller 13*d* that is in frictional contact with an outer circumferential surface of the first auxiliary roller 13*c* and is coupled to an axis 11*b* of the second roller 11, a swinging support rod 13*e* supporting these auxiliary rollers 13*c*, 13*d* to be swingable around an rotational axis of the sprocket 13*b*, and an elastic body (spring in this embodiment) 13*f* biasing the side of a swinging end of the swinging support rod 13*e* toward the ribbon body 4.

The blade 14 includes a blade support body 14*a* arranged in the vicinity of the rollers 10, 11, and contact pieces 14*b*, 14*c* biased on both sides of the blade support body 14*a* to be pressed onto the surfaces 10*a*, 11*a* of the rollers 10, 11, respectively, and come in contact with the surfaces. A reference numeral 15 denotes rollers guiding the ribbon body 4 at front and rear ends of the driving part 6 in the transfer direction.

In the work transfer device 1 thus configured, since the driving force from the driving motor 12 of the driving part 6 is transmitted to each of the first roller 10 and the second roller 11 as represented by arrows R1, R2, the ribbon body 4 in contact with the surfaces 10*a*, 11*a* of these rollers 10, 11 can be moved in the transfer direction X.

At this time, since the spring 13*f* applies a force to the second roller 11 to press the second roller 11 onto the ribbon body 4, even in the case of the thin ribbon body 4 of about 1 mm, frictional resistance between the rollers 10, 11 and the ribbon body 4 can be increased as much as possible, and the blade 14 keeps the surfaces 10*a*, 11*a* of the rollers 10, 11 flat at all times and therefore, a larger tensile force can be applied to the ribbon body 4. That is, an enough force to move the tool carriage 7 in the transfer direction can be fed via the ribbon body 4.

Since the upper end of the ribbon body 4 is stored in the slit 2, the ribbon body 4 can move in the forming direction of the slit 2 to move the tool carriage 7 along the slit 2. Further, since the roller conveyor 9 guiding the lower end of the ribbon body 4 is provided in the curved portion of the slit 2 and in front of and in the rear of the curved portion, the ribbon body 4 is not displaced from the slit 2 even in the curved portion of the slit 2, and can reliably move the tool carriage 7 along the slit 2.

Since the carriage coupling parts 5 attached to the upper end of the ribbon body 4 are arranged with the distance D therebetween in the transfer direction, when the ribbon body 4 changes its direction in the curved portion, the transfer direction of the tool carriage 7 can be reliably followed. Although, in this embodiment, the distance D is not much smaller than the length La of the tool carriage 7 in the transfer direction and is set to be about 30% of the total length L, the present invention is not limited to this ratio. It is preferred that as the distance D is larger, the recess 5*d* is made longer to provide a play.

The ribbon body 4 having the above-mentioned configuration can be separated to have the same length as the span L2 of each process, and the frame parts 3*pa*, 3*pb*, 3*pc* each can be separated to have a length of a half or one fourth of the span L2. Accordingly, by appropriately adjusting the combination of the frame parts 3*pa*, 3*pb*, 3*pc* and suitably increasing or decreasing the length of the ribbon body 4, the work transfer device 1 for a new working process can be easily reassembled.

In the above-mentioned embodiment, when the ribbon body (ribbon steel) 4 is sandwiched between the first roller 10 and the second roller 11, to which the rotational force is fed from the driving motor 12, from its both side surfaces, and is moved (transferred), the power transmission mechanisms 13*a* to 13*f* transmit the driving force of the first roller 10 to the second roller 11, that is, the driving force is transmitted to the first roller 10 on the opposite side of the driving motor 12 to move (transfer) the ribbon body (ribbon steel) 4.

Figure 6:
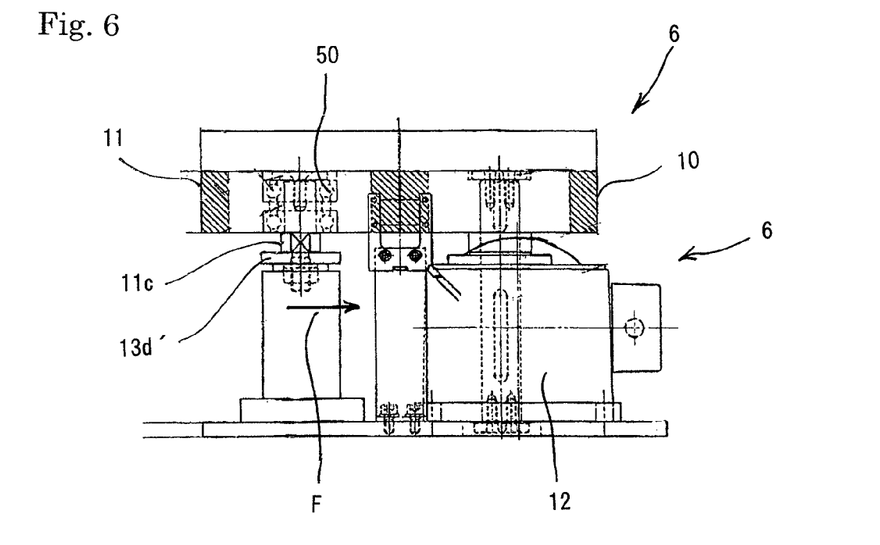
FIG. 6 is a view showing a driving part of a work transfer device in accordance with a second embodiment of the present invention when viewed from the transfer direction.
Figure 7:
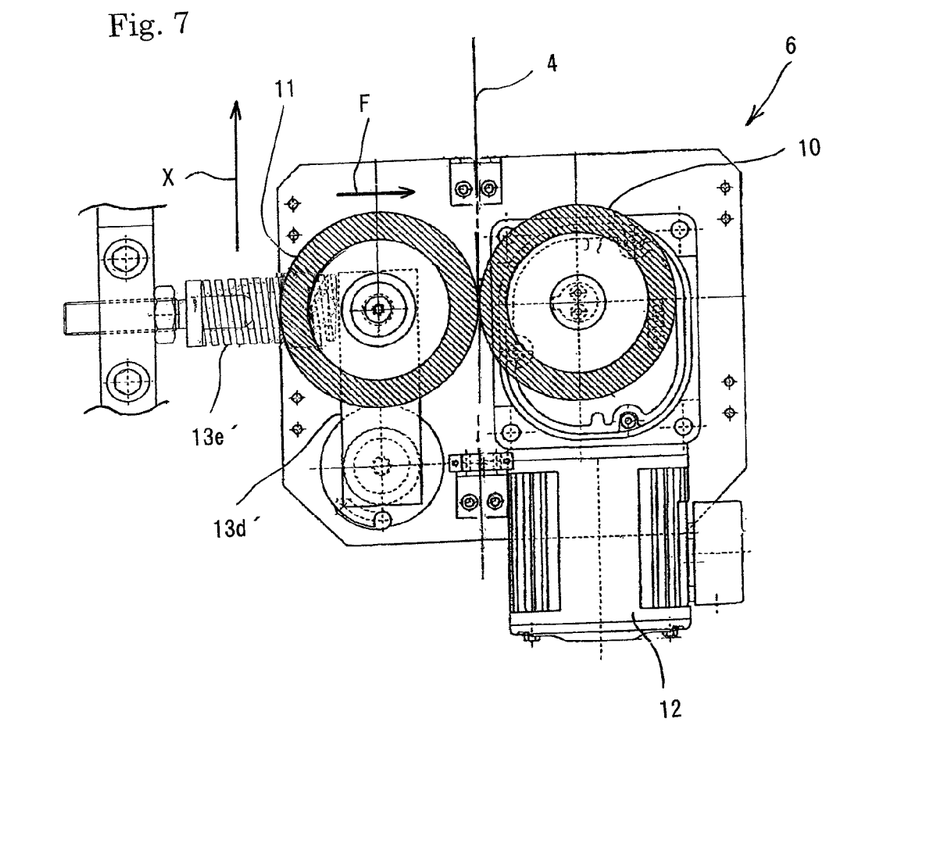
FIG. 7 is a plan view showing the driving part in the second embodiment.
Figure 8:
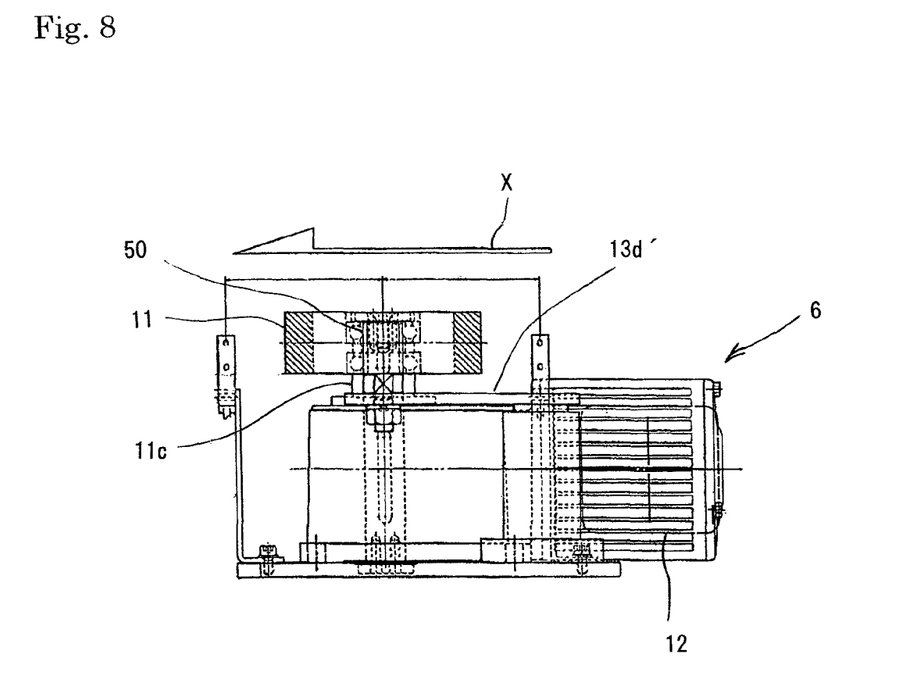
FIG. 8 is a side view showing the driving part in the second embodiment.

FIG. 6 to FIG. 8 show the second embodiment of the present invention in which the ribbon body (ribbon steel) 4 is moved (transferred) without transmitting the driving force to the opposite side of the driving motor 12 to omit an assembling process of a fast-forwarding unit for fast-forwarding the ribbon body (ribbon steel) 4. That is, in this embodiment, when the ribbon body (ribbon steel) 4 is sandwiched between the first roller 10, to which the rotational force is fed from the driving motor 12, and the second roller 11 following the first roller 10, from its both side surfaces, and is moved (transferred), by using the spring (an example of components of a tensioner) 13*f* for the second roller of the first roller 10 and the second roller 11, the ribbon body (ribbon steel) 4 is moved (transferred) while applying a constant tension to the second roller, such that the first roller 10 and the second roller 11 located opposite to the first roller across the ribbon body (ribbon steel) are in close contact with each other without transmitting the driving force of the driving motor 12 to the opposed second roller 11.

The same or equivalent constituents in FIG. 6 to FIG. 8 as those in FIG. 1 to FIG. 5 are given the same reference numerals, and in FIG. 6, FIG. 8, the ribbon body 4 is not shown. In FIG. 6 to FIG. 8, the driving part 6 includes the first roller 10 coming in contact with one side surface of the ribbon body 4, the second roller 11 that comes in contact with the other surface of the ribbon body 4 as opposed to the first roller 10 and is pressed onto the ribbon body 4, and the driving motor 12 feeding the rotational force of the first roller 10, and the second roller 11 is configured so as to follow the first roller 10 and rotate in the reverse direction to the rotational direction of the first roller 10. A reference numeral 11*c* denotes a rotational shaft 11*c* of the second roller 11, which is arranged via a bearing 50, a reference numeral 13*e*' denotes a swinging support rod supporting the second roller 11 so as to be swingable around the rotational shaft 11*c*, and a reference numeral 13*f* denotes an elastic body (spring in this embodiment) biasing a swinging end side of the swinging support rod 13*e*' toward the ribbon body 4. In FIG. 6, only a direction of biasing force applied to the swinging support rod 13*e*' by the spring 13*f* is represented by an arrow F, and the spring 13*f* itself is not shown. As described above, in this embodiment, since the ribbon body 4 is transferred in the state where the second roller 11 located on the opposite side of the driving motor 12 across the ribbon body 4 follows the first roller 10 (free rotating state), as compared to the case where the power transmission mechanisms 13*a* to 13*f* transmit the driving force to the second roller 11 for fast-forwarding of the ribbon body 4 as in the first embodiment, the assembling step of the fast-forwarding unit can be omitted, leading to a decrease in costs.

Although, in this embodiment, the driving part 6 does not include the blade coming in contact with the surfaces of the first roller 10 and the second roller 11 to scrape matters adhered to the roller surfaces off, the blade 14 shown in the first embodiment may be provided in this embodiment.

DESCRIPTION OF REFERENCE NUMERALS

1 Work transfer device
2 Slit
3 Frame
3*pa*, 3*pb*, 3*pc* Frame part
4 Ribbon body
4*a* Ribbon body part
4*b*, 4*c* Ribbon body coupling part
5 Carriage coupling part
6 Driving part
7 Tool carriage
7*a* Support part
7*b*, 7*c* Coupling part
9 Roller conveyor
10 First roller
11 Second roller
12 Driving motor
13 Power transmission mechanism
11*c* Rotational shaft of second roller
13*e*' Swinging support body
13*f* Spring
14 Blade
L2 Predetermined length
W Work
X Transfer direction

What is claimed is:

1. A work transfer device including a frame having a slit in a transfer direction, a ribbon body stored in the frame such that an upper portion is guided by the slit of the frame, a carriage coupling part that is connected to an upper end of the ribbon body and protrudes from an upper side of the frame, a driving part feeding power to move the ribbon body along the slit in the transfer direction, and a tool carriage, which has a support part supporting a work and has a coupling part coupled to the carriage coupling part, the tool carriage travelling on the frame.

2. The work transfer device according to claim 1, wherein the ribbon body is configured by ribbon body parts that can be coupled to each other at a predetermined length, each ribbon body part includes front and rear ribbon body coupling parts separably coupled to the front and rear ribbon body parts at front and rear ends in the transfer direction, and the frame is configured by frame parts that can be separated at each slit having the same length of each ribbon body part.

3. The work transfer device according to claim 1, wherein the slit is annularly formed, and a roller conveyor guiding the lower end of the ribbon body in the curved portion of the slit is provided.

4. The work transfer device according to claim 1, wherein the driving part includes a first roller coming in contact with one side surface of the ribbon body, a second roller opposed to the first roller, the second roller coming in contact with the other side surface of the ribbon body and being pressed onto the ribbon body, a driving motor feeding a rotational force to the first roller, and a power transmission mechanism transmitting power to rotate the second roller in a reverse direction to a rotational direction of the first roller due to the rotational force of the driving motor.

5. The work transfer device according to claim 1, wherein the driving part includes a first roller coming in contact with one side surface of the ribbon body, a second roller opposed to the first roller, the second roller coming in contact with the other side surface of the ribbon body and being pressed onto the ribbon body, and a driving motor feeding a rotational force to the first roller, the second roller is driven by the first roller and rotates in a reverse direction to a rotational direction of the first roller.

\* \* \* \* \*